United States Patent Office 2,771,737
Patented Nov. 27, 1956

2,771,737

PIPERIDINES AS HYPERGOLIC FUELS

Cleveland R. Scott, Arnold L. Ayers, and John E. Mahan, Bartlesville, Okla., assignors to Phillips Petroleum Company, a corporation of Delaware No Drawing. Application December 4, 1951, Serial No. 259,896

10 Claims. (Cl. 60—35.4)

This invention relates to rocket propellants. In one of its specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb the energy in kinetic form and subsequently be ejected in a specified direction. The type rocket to which our invention is applied is that type of jet propulsion device designated as a "pure" rocket, i. e., a thrust producer which does not make use of the surrounding atmosphere. A rocket of the type with which our invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or furfuryl alcohol as the hypergolic fuel component.

When employing 90–100 percent, or more, nitric acid, i. e., "white fuming nitric acid" as the oxidizer in a rocket bipropellant, it is often necessary, dependent on the specific fuel component, to make ignition more prompt by dissolving from 6 to 14 percent by weight nitrogen dioxide in the white fuming nitric acid forming thereby "red fuming" nitric acid. A fuel component of a bipropellant material of the type described herein, is spontaneously ignited upon contacting the oxidized, and for that reason is referred to herein as being "hypergolic." A ratio of oxidizer to hypergolic fuel based on stoichiometric amounts can be utilized within the limits of 0.5:1 to 1.5:1 if desired, the efficiency of the combustion being less at ratios below 1:1 and the use of the oxidizer being less economical at ratios above 1:1. However, practical consideration may necessitate the use of higher ranges, even as high as 6:1.

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with a broad embodiment of our invention we have provided rocket bipropellant materials, the fuel components of which comprises piperidines characterized by the structural formula

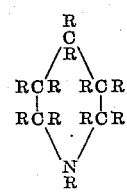

wherein R is a hydrogen atom or a hydrocarbon radical having not more than 12 carbon atoms and wherein the total number of carbon atoms present in the formula is not greater than 17. R may be a hydrogen atom or a hydrocarbon radical selected from the group consisting of alkyl, alkenyl, aryl, cycloalkyl, cycloalkenyl, aralkyl and alkaryl radicals, the alkyl radical being preferred, especially those having not more than 3 carbon atoms. As a preferred embodiment of our invention the hydrocarbon substituted piperidines should contain at least one hydrogen atom attached to each of the piperidine ring carbon atoms, that is, at least one R attached to the carbon atoms in the above-described structural formula is a hydrogen atom.

Illustrative of the hypergolic hydrocarbon substituted piperidines of our invention are 2-methylpiperidine, 2,3-dimethylpiperidine and 2,4-dimethylpiperidine. Other hydrocarbon substituted piperidines such as 2,3,4,5-tetramethylpiperidine; 2,2-dimethylpiperidine; 2-ethylpiperidine; 2-phenylpiperidine; 4-benzylpiperidine; 2,5-tert-butylpiperidine; 2-cyclopropylpiperidine; 2,5-cyclopentenylpiperidine; 4-cumenylpiperidine are suitable as well as their higher and lower molecular weight homologs. Particularly suitable are the 2-alkyl substituted and the 2,5-alkyl substituted piperidines. Piperidine itself is also especially suited in our invention.

These compounds are well known in the art. The commonest method for the synthesis of these piperidine compounds is by the reduction of the corresponding pyridine derivatives. Under special circumstances, however, catalytic methods have almost entirely replaced the earlier used reduction with sodium and alcohols, see Heterocyclic Compounds, Elderfield, vol. I, published by John Wiley and Sons Incorporated, page 631 et seq. the disclosures of which are relative to the production of the piperidines of this invention and are incorporated into and made part of this disclosure.

These piperidines are hypergolic per se and are also hypergolic when admixed with non-hypergolic materials, particularly hydrocarbons, even in a state of dilution as high as 20 to 30% by volume and in some cases up to 60% by volume and higher. Suitable non-hypergolic diluents include the normally liquid hydrocarbons or mixtures thereof, particularly hydrocarbon fuels in the gasoline boiling range, jet fuels, n-heptane, benzene, kerosene, isooctane, diisobutylene, methylcyclohexane, toluene, and the like.

Other suitable oxidizers or oxidants for these hypergolic fuels in addition to white or red fuming nitric acid can be used in the bipropellant fuel compositions of our invention. These suitable oxidants include materials such as hydrogen peroxide, ozone, nitrogen tetroxide, oxygen and mixed acids, especially anhydrous mixtures of nitric and sulfuric acids such as 80–90 percent by volume white or red fuming nitric acids and 20–10 percent by volume anhydrous or fuming sulfuric acid. It is within the scope of this invention to employ preferably dissolved in the oxidizer, ignition catalysts or oxidation catalysts. These oxidation catalysts include certain metal salts, such as the chlorides and naphthenates of iron, zinc, cobalt and similar heavy metals.

The advantages of this invention are illustrated in the following example. The reactants and their proportions and their specific ingredients are presented as being typical and should not be construed to limit the invention.

EXAMPLE I

Each of the piperidines described hereinbelow was tested for spontaneous ignition employing fuming nitric acid as the oxidizer. In each test 1 part by volume of a mixture of a selected piperidine and n-heptane was dropped into a vessel containing 2.3 parts by volume fuming nitric acid. The mixture of the selected piperidine and n-heptane coming into contact with the fuming nitric acid ignited spontaneously. Normal heptane was employed as a diluent to determine the maximum amount of dilution a piperidine could tolerate and still retain the property of being hypergolic. Tests were conducted at room temperature, about 70° F. The results are set forth in Table I.

Table I

| Compound | Oxidant | Maximum Dilution, Percent n-heptane |
| --- | --- | --- |
| Piperidine | Red Fuming Nitric Acid | Ignition.[1] |
| Do | White Fuming Nitric Acid | Do.[1] |
| 2-Methylpiperidine | Red Fuming Nitric Acid | 10. |
| Do | White Fuming Nitric Acid | Ignition.[1] |
| 2,3-Dimethylpiperidine | Red Fuming Nitric Acid | Do.[1] |
| Do | White Fuming Nitric Acid | Do.[1] |
| 2,4-Dimethylpiperidine | Red Fuming Nitric Acid | 20. |
| Do | White Fuming Nitric Acid | 10. |

[1] No dilution.

As an added feature of this invention the piperidines of this invention are also useful for providing fast burning fuels suitable for use in rocket engines and the like where a hypergolic fuel is not necessarily required. For example, the fuel components of this invention dissolved in a liquid hydrocarbon, such as gasoline, a jet fuel, a kerosene, a naphtha or a petroleum fraction having a boiling point usually not greater than 800° F., even if the resulting solution is not hypergolic with an oxidant such as fuming nitric acid, can be used together with an oxidant and a suitable igniter as a rocket propellant. These fast burning fuels are particularly useful if, for various reasons, a hypergolic fuel is not desired or required. The piperidines of this invention may be added to a hydrocarbon liquid in a minor amount, usually from about 1 to 20% by volume of the total mixture to produce fast burning fuels. Suitable fast burning fuels are 1–20% by volume piperidine and 80–99% by volume of a petroleum fraction in the gasoline boiling range, 1–20% by volume 2-methylpiperidine and 80–99% by volume gasoline, 1–20% by volume 2, 3 or 2,4-dimethylpiperidine and 80–99% by volume gasoline.

As will be evident to those skilled in the art, various modifications can be made or followed in the light of the foregoing disclosure and discussion without departing from the spirit or scope of the disclosure or from the scope of the claims.

We claim:

1. A method for producing immediate thrust comprising simultaneously introducing separate streams of an oxidant component and a fuel component of a bipropellant into contact with each other in a combustion chamber of a reaction motor in such proportions as to produce spontaneous ignition, said fuel component comprising a piperidine characterized by the structural formula:

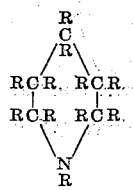

wherein R is selected from the group consisting of a hydrogen atom and a hydrocarbon radical selected from the group consisting of alkyl, alkenyl, aryl, cycloalkyl, cycloalkenyl, aralkyl and alkaryl radicals having not more than 12 carbon atoms and wherein the total number of carbon atoms present in said formula is not greater than 17.

2. The method of claim 1 wherein said fuel component is dissolved in a non-hypergolic liquid hydrocarbon.

3. The method of claim 1 wherein said hydrocarbon radical contains not more than three carbon atoms.

4. The method of claim 1 wherein said fuel component is piperidine.

5. The method of claim 1 wherein said fuel component is 2-methylpiperidine.

6. The method of claim 1 wherein said fuel component comprises 2,3-dimethylpiperidine.

7. The method of claim 1 wherein said fuel component comprises, 2,4-dimethylpiperidine.

8. The method of claim 1 wherein said fuel component comprises, 2,2-dimethylpiperidine.

9. A method for producing immediate thrust comprising simultaneously introducing separate streams of an oxidant component and a fuel component of a bipropellant into contact with each other in a combustion chamber of a reaction motor in such proportions as to produce spontaneous ignition, said fuel component comprising a 2-alkyl substituted piperidine wherein the alkyl group contains not more than 12 carbon atoms and wherein the total number of carbon atoms in the piperidine molecule is not greater than 17.

10. A method for producing immediate thrust comprising simultaneously introducing separate streams of an oxidant component and a fuel component of a bipropellant into contact with each other in a combustion chamber of a reaction motor in such proportions as to produce spontaneous ignition, said fuel component comprising a 2,4-alkyl substituted piperidine wherein the substituent alkyl group contains not more than 12 carbon atoms and wherein the total number of carbon atoms in the piperidine molecule is not greater than 17.

References Cited in the file of this patent

UNITED STATES PATENTS

| 1,524,674 | Sadtler | Feb. 3, 1925 |
| 2,512,297 | Biswell et al. | June 20, 1950 |
| 2,573,471 | Malina et al. | Oct. 30, 1951 |